(12) United States Patent
Samie et al.

(10) Patent No.: US 11,745,578 B2
(45) Date of Patent: Sep. 5, 2023

(54) P2 HYBRID TRANSMISSION

(71) Applicant: GM Global Technology Operations LLC, Detroit, MI (US)

(72) Inventors: Farzad Samie, Franklin, MI (US); Madhusudan Raghavan, West Bloomfield, MI (US); Jian Yao, Shanghai (CN); Alireza Fatemi, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 397 days.

(21) Appl. No.: 17/141,597

(22) Filed: Jan. 5, 2021

(65) Prior Publication Data

US 2022/0212534 A1    Jul. 7, 2022

(51) Int. Cl.
| | |
|---|---|
| *B60K 6/442* | (2007.10) |
| *F16H 57/02* | (2012.01) |
| *F16H 45/02* | (2006.01) |
| *B60K 6/383* | (2007.10) |
| *B60K 6/365* | (2007.10) |
| *H02K 7/00* | (2006.01) |
| *H02K 7/10* | (2006.01) |
| *H02K 7/116* | (2006.01) |
| *F16H 57/04* | (2010.01) |

(52) U.S. Cl.
CPC ............ *B60K 6/442* (2013.01); *B60K 6/365* (2013.01); *B60K 6/383* (2013.01); *F16H 45/02* (2013.01); *F16H 57/02* (2013.01); *F16H 57/0476* (2013.01); *H02K 7/006* (2013.01); *H02K 7/10* (2013.01); *H02K 7/116* (2013.01); *B60Y 2200/92* (2013.01); *F16H 2057/02034* (2013.01); *F16H 2057/02043* (2013.01)

(58) Field of Classification Search
CPC .......... B60K 6/42; B60K 6/383; B60Y 7/006; H02K 7/006
See application file for complete search history.

(56) References Cited

U.S. PATENT DOCUMENTS

| | | | |
|---|---|---|---|
| 6,777,837 B2 * | 8/2004 | Tsuzuki ................. | B60K 6/485 903/952 |
| 7,017,693 B2 * | 3/2006 | Omote ................... | B60L 50/16 477/3 |
| 7,114,604 B2 * | 10/2006 | Masuya ................. | B60K 6/387 192/3.3 |
| 8,652,001 B2 * | 2/2014 | Iwase ..................... | F16D 21/08 477/8 |
| 2008/0072586 A1 * | 3/2008 | Hammond ............. | B60K 6/485 60/330 |
| 2013/0086798 A1 * | 4/2013 | Frait ....................... | B60K 6/40 903/909 |

(Continued)

*Primary Examiner* — Brian L Swenson
(74) *Attorney, Agent, or Firm* — Vivacqua Crane, PLLC

(57) ABSTRACT

A hybrid powertrain for an automobile includes a transmission adapted to provide power to wheels of the automobile, an engine adapted to provide power to an input shaft of the transmission, and an electric motor-generator unit adapted to provide power to the input shaft of the transmission, wherein the electric motor-generator is positioned within the transmission, coaxial with the transmission input shaft, the electric motor-generator being supported by and enclosed within a pump support of the transmission.

20 Claims, 3 Drawing Sheets

(56) References Cited

U.S. PATENT DOCUMENTS

| | | | | |
|---|---|---|---|---|
| 2013/0086897 A1* | 4/2013 | Frait | .................. | B60K 6/40 |
| | | | | 903/915 |
| 2013/0088105 A1* | 4/2013 | Frait | .................. | B60L 50/16 |
| | | | | 310/71 |
| 2014/0342873 A1* | 11/2014 | Inoue | .................. | B60W 10/08 |
| | | | | 180/65.265 |

* cited by examiner

P2 HYBRID TRANSMISSION

The present disclosure relates to motor vehicle powertrains. More specifically, aspects of this disclosure relate to a hybrid powertrain having a P2 hybrid transmission.

Many available motor vehicles, such as the modern-day automobile, include a powertrain that operates to propel the vehicle and power the onboard vehicle electronics. The powertrain, which is inclusive of and sometimes improperly referred to as a drivetrain, is generally comprised of an engine that delivers driving power to the vehicle's final drive system (e.g., rear differential, axle, and wheels) through a multi-speed power transmission. Automobiles have traditionally been powered by a reciprocating-piston type internal combustion engine (ICE) because of its ready availability and relatively inexpensive cost, light weight, and overall efficiency. Such engines include 2- or 4-stroke compression-ignited diesel engines and 4-stroke spark-ignited gasoline engines.

Hybrid vehicles, on the other hand, utilize alternative power sources to propel the vehicle, minimizing reliance on the engine for power and thereby increasing overall fuel economy. A hybrid electric vehicle (HEV), for example, incorporates both electric energy and chemical energy, and converts the same into mechanical power to propel the vehicle and power the vehicle systems. The HEV generally employs one or more electric machines, such as electric motor-generator units (MGUs), that operate individually or in concert with an internal combustion engine to propel the vehicle. Since hybrid vehicles can derive their power from sources other than the engine, engines in hybrid vehicles can be turned off while the vehicle is propelled by the alternative power source(s).

One example of a hybrid powertrain is a P2 hybrid powertrain. In a P2 hybrid arrangement, a MGU and an engine provide power input to a transmission in parallel. Either one of the MGU or the engine separately, or in combination may provide power to the input side of the transmission. In a P2 arrangement the MGU is often positioned adjacent to the transmission, or off-axis, wherein power from the MGU is transferred to the input side of the transmission through a belt or chain connection. In other arrangements, the MGU is placed coaxially to the input of the transmission, up-stream of the transmission. In either of these instances, the addition of the MGU creates packaging concerns requiring increase in the lateral and axial space needed for the powertrain within the vehicle. Other arrangements include an MGU housed within the transmission to reduce packaging and power transfer concerns, however, the overall size of the transmission must be increased to accommodate the addition of the MGU, thereby creating packaging concerns for placement of the transmission within the automobile.

Thus, while current P2 hybrid powertrains achieve their intended purpose, there is a need for a new and improved P2 hybrid powertrain that requires minimal additional space within the transmission and minimizes packaging concerns.

SUMMARY

According to several aspects of the present disclosure, a hybrid powertrain for an automobile includes a transmission adapted to provide power to wheels of the automobile, an engine adapted to provide power to an input shaft of the transmission, and an electric motor-generator unit adapted to provide power to the input shaft of the transmission, wherein the electric motor-generator is positioned within the transmission, coaxial with the transmission input shaft, the electric motor-generator being supported by and enclosed within a pump support of the transmission.

According to another aspect, the hybrid powertrain includes a torque converter positioned between and interconnecting the engine to the input shaft of the transmission, the torque converter having a one-way clutch adapted to drivingly connect the torque converter to the input shaft of the transmission when power is being provided to the torque converter from the engine and to allow the input shaft of the transmission to rotate freely relative to the torque converter when power is being provided to the input shaft of the transmission from the electric motor-generator unit.

According to another aspect, the pump support defines a motor housing, the electric motor-generator including a stator that is positioned coaxially with the input shaft of the transmission and secured to inner walls of the motor housing and a rotor that is rotatably positioned coaxially with the input shaft of the transmission within the motor housing in operational engagement with the stator and rotatably attached to the input shaft of the transmission.

According to another aspect, the transmission includes a two-piece stator shaft having a first piece and a second piece, wherein a gap between the first piece of the stator shaft and the second piece of the stator shaft is adapted to allow rotational attachment of the rotor of the electric motor-generator unit to the input shaft of the transmission.

According to another aspect, the electric motor-generator unit is an axial flux electric motor-generator unit, wherein the stator and rotor are axially aligned.

According to another aspect, the electric motor-generator unit is a radial flux electric motor-generator unit, wherein the stator is radially outward and encircles the rotor.

According to another aspect, the hybrid powertrain further includes a planetary gearset positioned between and interconnecting the rotor and the input shaft of the transmission.

According to another aspect, the planetary gearset includes a ring gear, a sun gear, a carrier and a plurality of pinion gears supported on the carrier and in geared engagement with the sun gear and the ring gear, the carrier rotatably attached to the input shaft of the transmission.

According to another aspect, the hybrid powertrain further includes a connection hub positioned between and interconnecting the rotor and the input shaft of the transmission.

According to another aspect, the connection hub includes oil passages defining a fluid connection between the motor housing and a lube channel within the input shaft of the transmission.

According to several aspects of the present disclosure, a hybrid transmission includes an input shaft adapted to receive power from an engine of the automobile, and an electric motor-generator unit adapted to provide power to the input shaft of the transmission, wherein the electric motor-generator is positioned within the transmission, coaxial with the transmission input shaft, the electric motor-generator being supported by and enclosed within a pump support of the transmission.

According to another aspect, the hybrid transmission further includes a torque converter adapted to interconnect an engine to the input shaft of the transmission, the torque converter having a one-way clutch adapted to drivingly connect the torque converter to the input shaft of the transmission when power is being provided to the torque converter and to allow the input shaft of the transmission to rotate freely relative to the torque converter when power is being provided to the input shaft of the transmission from the electric motor-generator unit.

According to another aspect, the pump support defines a motor housing, the electric motor-generator including a stator that is positioned coaxially with the input shaft of the transmission and secured to inner walls of the motor housing and a rotor that is rotatably positioned coaxially with the input shaft of the transmission within the motor housing in operational engagement with the stator and rotatably attached to the input shaft of the transmission.

According to another aspect, the hybrid transmission further includes a two-piece stator shaft having a first piece and a second piece, a gap between the first piece of the stator shaft and the second piece of the stator shaft adapted to allow rotational attachment of the rotor of the electric motor-generator unit to the input shaft of the transmission.

According to another aspect, the electric motor-generator unit is an axial flux electric motor-generator unit, wherein the stator and rotor are axially aligned.

According to another aspect, the electric motor-generator unit is a radial flux electric motor-generator unit, wherein the stator is radially outward and encircles the rotor.

According to another aspect, the hybrid transmission further includes a planetary gearset positioned between and interconnecting the rotor and the input shaft of the transmission.

According to another aspect, the planetary gearset includes a ring gear, a sun gear, a carrier and a plurality of pinion gears supported on the carrier and in geared engagement with the sun gear and the ring gear, the carrier rotatably attached to the input shaft of the transmission.

According to another aspect, the hybrid transmission further includes a connection hub positioned between and interconnecting the rotor and the input shaft of the transmission, the connection hub including oil passages defining a fluid connection between the motor housing and a lube channel within the input shaft of the transmission.

According to several aspects of the present disclosure, a hybrid transmission for an automobile includes an input shaft, a two-piece stator shaft having a first piece and a second piece, a torque converter adapted to interconnect an engine to the input shaft of the transmission, a pump support defining a motor housing, and an electric motor-generator unit adapted to provide power to the input shaft of the transmission, wherein the electric motor-generator is positioned within the motor housing and includes a stator that is positioned coaxially with the input shaft of the transmission and secured to inner walls of the motor housing and a rotor that is rotatably positioned coaxially with the input shaft of the transmission within the motor housing in operational engagement with the stator and rotatably attached to the input shaft of the transmission by one of a planetary gearset and a connection hub, the electric motor-generator unit being one of an axial flux electric motor-generator unit, wherein the stator and rotor are axially aligned, and a radial flux electric motor-generator unit, wherein the stator is radially outward and encircles the rotor, wherein, the torque converter includes a one-way clutch adapted to drivingly connect the torque converter to the input shaft of the transmission when power is being provided to the torque converter and to allow the input shaft of the transmission to rotate freely relative to the torque converter when power is being provided to the input shaft of the transmission from the electric motor-generator unit, and the rotor of the electric motor-generator unit is rotationally attached to the input shaft of the transmission through a gap between the first piece of the stator shaft and the second piece of the stator shaft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
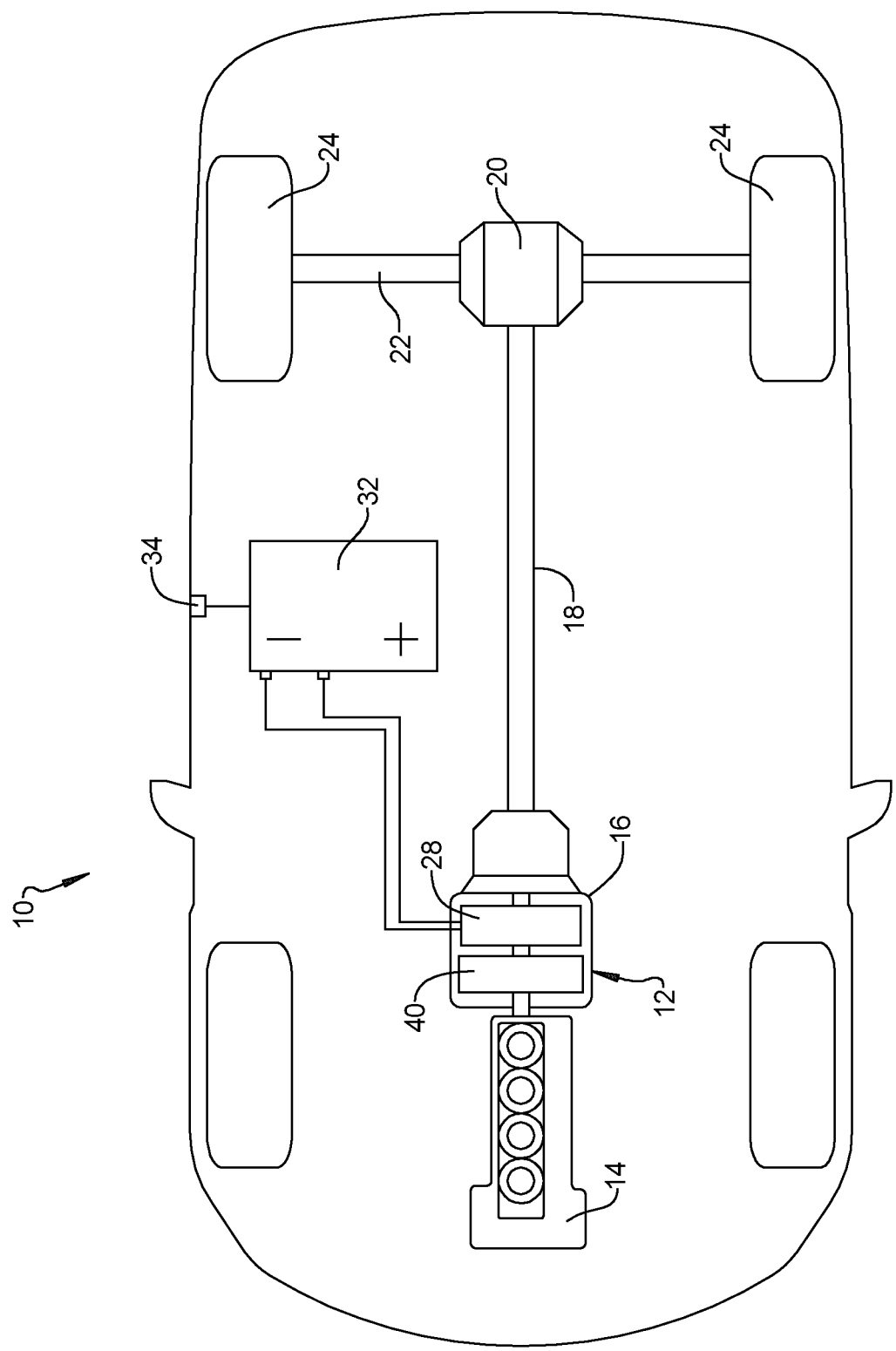
FIG. 1 is a schematic view of an automobile incorporating a hybrid powertrain and hybrid transmission according to an exemplary embodiment.

Referring now to the drawings, wherein like reference numbers refer to like features throughout the several views, there is shown in FIG. 1 a schematic illustration of a representative automobile 10 with a P2 hybrid-electric powertrain 12 in accordance with the present disclosure. The illustrated automobile 10 is merely an exemplary application with which the novel aspects of this disclosure may be practiced. The implementation of the present concepts into a P2 hybrid electric architecture should also be appreciated as an exemplary application of the novel concepts disclosed herein. As such, it will be understood that the aspects and features of the present disclosure may be integrated into other vehicle powertrain configurations and utilized for any logically relevant type of motor vehicle. Lastly, the hybrid powertrain 12 shown in FIG. 1 hereof has been greatly simplified, it being understood that further information regarding the standard construction and operation of a hybrid vehicle is known.

The exemplary hybrid powertrain shown in FIG. 1 includes an engine 14 that is drivingly connected to a multi-speed transmission 16. The transmission 16 is drivingly connected to a drive shaft 18, rear differential 20 and rear axle 22 to provide power to the rear wheels 24 of the automobile 10. The engine 14 transfers power, preferably by way of torque through an engine crankshaft, to an input shaft 26 of the transmission 16. The transmission 16, in turn, is adapted to manipulate and distribute power from the engine 14 to the drive shaft 18, rear differential 20, rear axle 22 and, finally to the rear wheels 24 of the automobile 10. The engine 14 may be any now known or hereinafter developed engine, such as a 2-stroke or 4-stroke diesel or a 4-stroke gasoline engine, which is readily adapted to provide its available power output typically at a number of revolutions per minute (RPM). Although not explicitly portrayed in FIG. 1, it should be appreciated that the automobile may comprise any known configuration, such as, but not limited to front wheel drive (FWD), rear wheel drive (RWD), four-wheel drive (4WD), all-wheel drive (AWD).

The hybrid powertrain 12 includes an electric motor-generator unit 28 that is adapted to provide power to the input shaft 26 of the transmission 16. The electric motor-generator unit 28 is positioned within the transmission 16, coaxial with the transmission input shaft 26, and is supported by and enclosed within a pump support 30 of the transmission 16.

The electric motor-generator unit 28 may be of any conventional type, such as, but not limited to DC series motor, brushless DC motor, permanent magnet synchronous motor, three-phase induction AC motor and multi-phase (greater than three) induction AC motors, and switched reluctance motors. The electric motor-generator unit 28 serves a dual purpose. The electric motor-generator unit 28 provides torque to drive the input shaft 26, and when the automobile 10 is braking, the electric motor-generator unit 28 can become a generator and charge the batteries. The electric motor-generator unit 28 may be used in conjunction with the engine 14 so the automobile 10 is powered by both simultaneously, or the electric motor-generator unit 28 may solely provide power to the automobile 10, allowing the engine 14 to idle or shut off. The automobile 10 includes a battery pack 32 to provide power to the electric motor-generator unit 28 and a charging port 34 to allow the battery pack 32 to be charged from an external power source.

Figure 2:
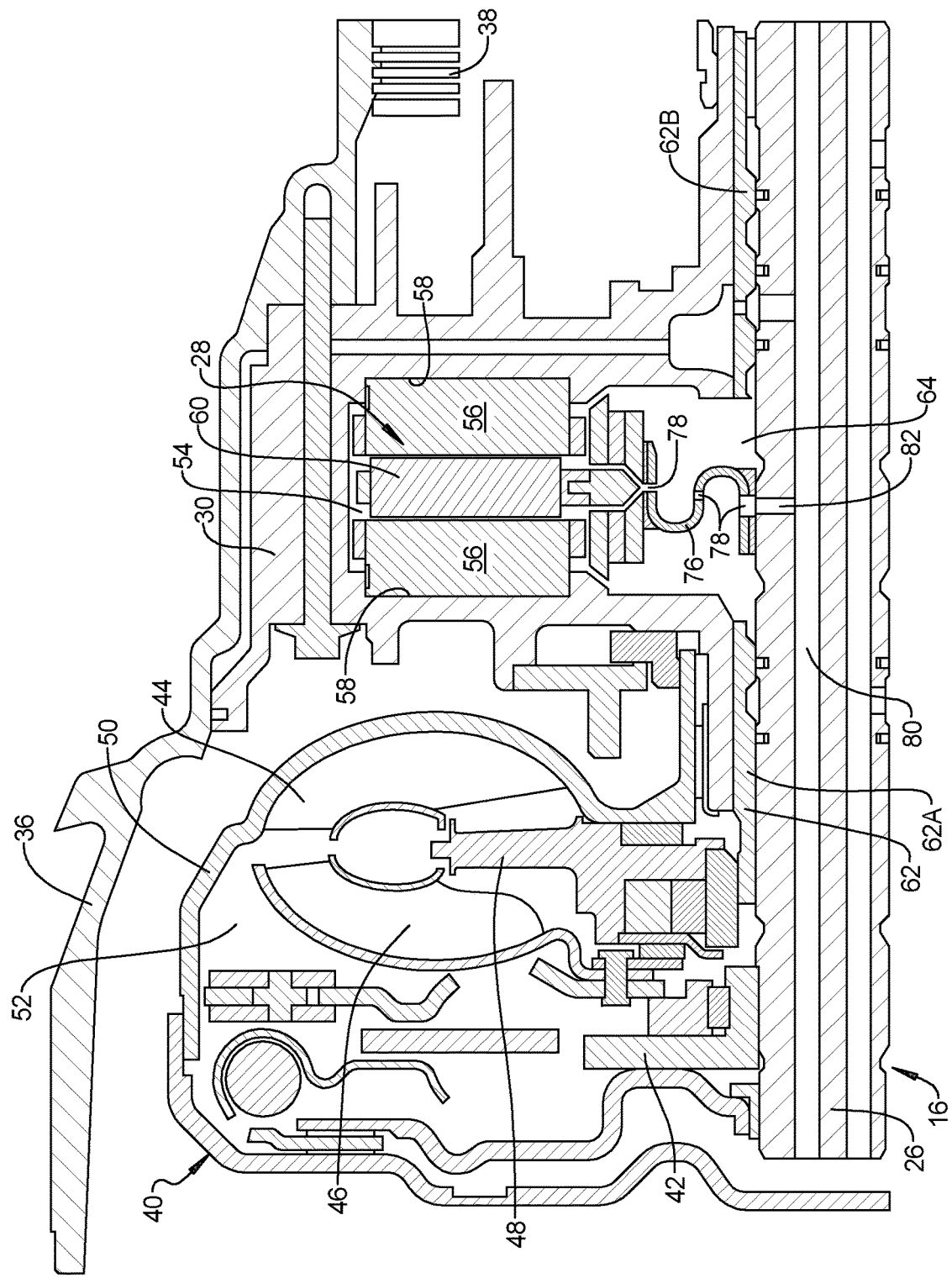
FIG. 2 is a partial cross-sectional view of a hybrid transmission according to an exemplary embodiment.

Referring to FIG. 2, the hybrid transmission 16 includes a main housing 36 that encases the pump support 30. The input shaft 26 of the transmission 16 transfers power to one or more selectively engageable torque transmitting mechanisms 38 (e.g., clutch, brake, etc.) and planetary gearsets to rotate a transmission output shaft (not shown). The main housing 36 covers the innermost components of the transmission 16, such as the pump support 30, planetary gear arrangements, input shaft 26, and torque transmitting devices 38 (all of which are mentioned for explanatory purposes and not all are shown).

The transmission 16 of the hybrid powertrain 12 further includes a torque converter 40 positioned between and interconnecting the engine 14 to the input shaft 26 of the transmission 16. The torque converter 40 includes a one-way clutch 42 adapted to drivingly connect the torque converter 40 to the input shaft 26 of the transmission 16 when power is being provided to the torque converter 40 from the engine 14 and to allow the input shaft 26 of the transmission 16 to rotate freely relative to the torque converter 40 when power is being provided to the input shaft 26 of the transmission 16 from the electric motor-generator unit 28.

The torque converter 40 is a fluid coupling for operatively connecting the engine 14 with the input shaft 26 of the transmission 16. The torque converter 40 includes an impeller 44, a turbine 46, and a stator 48. To protect these components, the torque converter 40 is constructed with an annular housing 50 that defines a working hydraulic fluid chamber 52. The annular housing 50 is drivingly connected to the engine 14 such that rotational power is transferable back-and-forth therebetween.

The impeller 44, also referred to in the art as "pump," is situated in serial power-flow fluid communication with the turbine 46. Interposed between the impeller 44 and turbine 46 is a stator 48 that selectively alters fluid flow returning from the turbine 46 to the impeller 44 such that returning fluid aids, rather than impedes, rotation of the impeller 44. The transfer of engine torque to the turbine 46 via the annular housing 50 and impeller 44 is through the operation of hydraulic fluid, such as transmission oil, in the fluid chamber 52. More specifically, rotation of the impeller 44 causes the hydraulic fluid to be directed toroidally outward toward the turbine 46. When this occurs with sufficient force to overcome the inertial resistance to rotation, the turbine 46, coaxially oriented with the impeller 44 begins to rotate with the impeller 44. The fluid flow exiting the turbine 46 is directed back into the impeller 44 by way of the stator 48. The stator 48, located between the flow exit section of the turbine 46 and the flow entrance section of the impeller 44, redirects the fluid flow from the turbine 46 to the impeller 44 in the same direction as impeller rotation, thereby reducing pump torque and causing torque multiplication.

The one-way clutch 42 is positioned and interconnects the turbine 46 of the torque converter 40 to the input shaft 26 of the transmission 16. The one-way clutch 42 functions to automatically operatively connect (or "lock") the turbine 46 to the input shaft 26 when positive torque is being transferred from the turbine 46 to the input shaft 26. During a positive torque operating mode, when power is being transferred to the input shaft 26 from the engine 14, the one-way clutch 42 contemporaneously locks such that the turbine 46 is mechanically coupled to the input shaft 26. Conversely, the one-way clutch 42 functions to automatically operatively disconnect (or "overrun") the turbine 46 from the input shaft 26 when the torque reverses direction.

The pump support 30 defines a motor housing 54. The electric motor-generator unit 28 is positioned within the motor housing 54. By modifying current pump support designs to include a motor housing 54 therein, the amount of additional space needed to implement the electric motor-generator unit 28 is minimized. The electric motor-generator unit 28 includes a stator 56 that is positioned coaxially with the input shaft 26 of the transmission 16 and secured to inner walls 58 of the motor housing 54. A rotor 60 is rotatably positioned coaxially with the input shaft 26 of the transmission 16 within the motor housing 54 in operational engagement with the stator 56 and rotatably attached to the input shaft 26 of the transmission 16.

Figure 3:
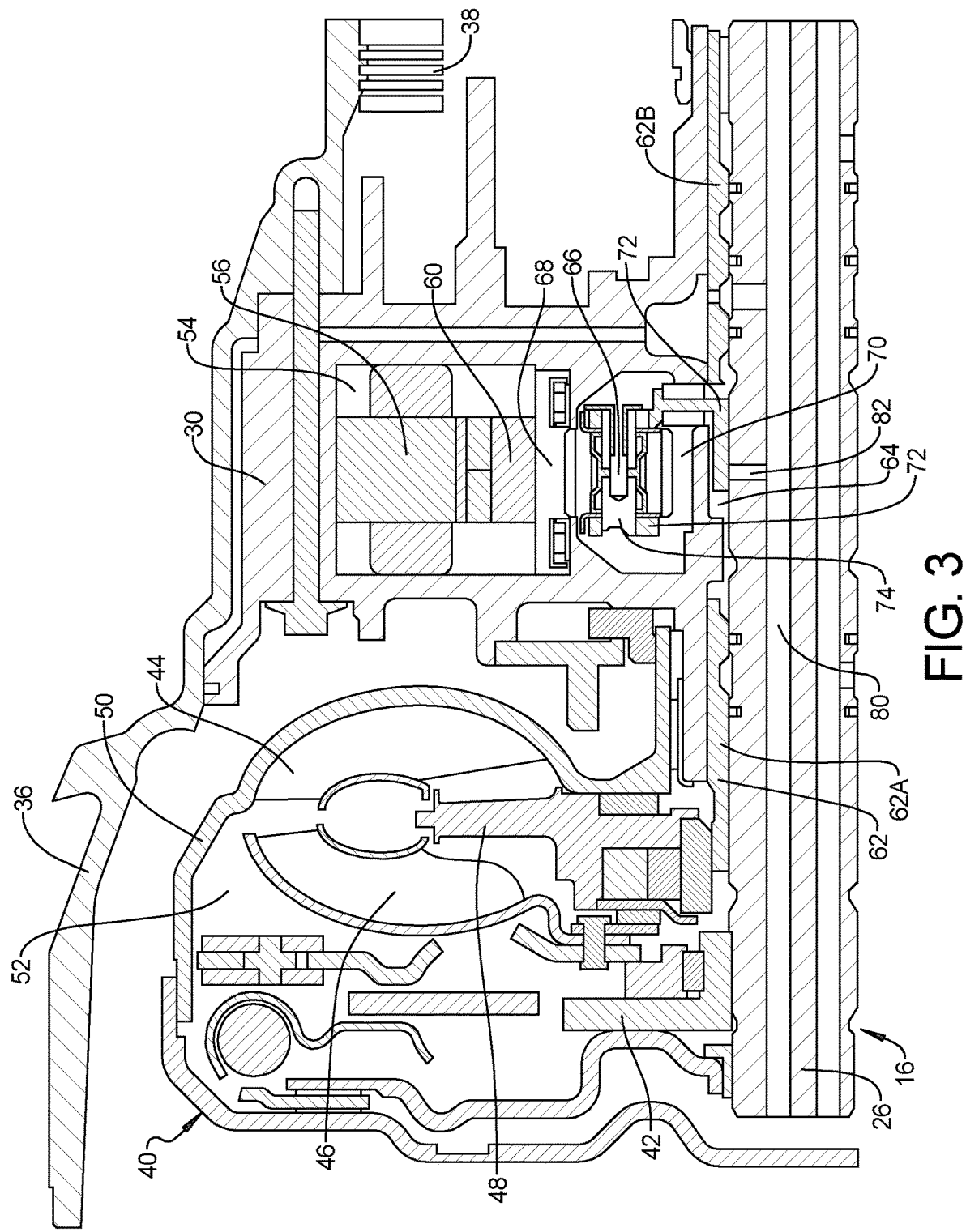
FIG. 3 is a partial cross-sectional view of a hybrid transmission according to another exemplary embodiment.

In an exemplary embodiment, the transmission 16 includes a two-piece stator shaft 62 having a first piece 62A and a second piece 62B. A gap 64 between the first piece 62A of the stator shaft 62 and the second piece 62B of the stator shaft 62 allows rotational attachment of the rotor 60 of the electric motor-generator unit 28 to the input shaft 26 of the transmission 16. As shown in FIG. 2, in an exemplary embodiment, the electric motor-generator unit 28 is an axial flux electric motor-generator unit, wherein the stator 56 and rotor 60 are axially aligned. Referring to FIG. 3, in another exemplary embodiment, the electric motor-generator unit 28 is a radial flux electric motor-generator unit, wherein the stator 56 is radially outward and encircles the rotor 60.

Referring again to FIG. 3, in an exemplary embodiment, the transmission 16 includes a planetary gearset 66 positioned between and interconnecting the rotor 60 of the electric motor-generator unit 28 and the input shaft 26 of the transmission 16. The planetary gearset 66 provides a gear reduction between the electric motor-generator unit 28 and the input shaft 26 of the transmission 16 to increase torque.

As shown, the planetary gearset 66 includes a ring gear 68, a sun gear 70, a carrier 72 and a plurality of pinion gears 74 supported on the carrier 72 and in gear mesh engagement with the sun gear 70 and the ring gear 68. This arrangement affords several advantages over other possible arrangements, including compactness, the possibility for the sun gear 70, ring gear 68, and carrier 72 to use a common central shaft, high 'torque density' due to the load being shared by multiple pinion gears 74, and tangential forces between the gears 68, 70, 74 being cancelled out at the center of the gears 68, 70, 74 due to equal and opposite forces distributed among the meshes between the pinion gears 74 and the ring and sun gears 68, 70.

The ring gear 68 is attached to or integrally formed within a radially inward surface of the rotor 60. The sun gear 70 is attached to or integrally formed within a portion of the pump support 30. The carrier 72 is rotatably attached to the input shaft 26 of the transmission 16. The carrier is rotatably attached to the input shaft 26 by a splined or geared engagement. As the rotor 60 spins, the carrier 72 rotates at a slower rate due to the gear reduction of the planetary gearset 66, and rotates the input shaft 26 of the transmission 16. With the sun gear 70 held stationary, the side of the pinion gears 74 in meshed engagement with the sun gear 70 can't move either, and the pinion gears 74 will roll along the outside of the sun gear 70. In an exemplary embodiment, the tangential speed at the mesh with the ring gear 68 (rotor 60) will be equal for both the ring gear 68 and the pinion gears 74, and the center of the pinion gears 74 and the carrier 72 will be moving at half of that, being halfway between a point moving at full speed, and one not moving at all, thus providing a 2:1 reduction. It should be understood that the planetary gearset 66 may provide any suitable desired gear reduction ratio.

Referring again to FIG. 2, in an exemplary embodiment, the transmission 16 includes a connection hub 76 positioned between and interconnecting the rotor 60 and the input shaft 26 of the transmission 16. Rotation of the rotor 60 of the electric motor-generator unit 28 is directly transferred to the input shaft 26 of the transmission 16. The connection hub 76 rotatably interconnects the rotor 60 and the input shaft 26 of the transmission 16 with a splined or geared engagement between the rotor 60 and the connection hub 76 and between the connection hub 76 and the input shaft 26.

In another exemplary embodiment, the connection hub 76 includes oil passages 78 defining a fluid connection between the motor housing 54 and a lube channel 80 within the input shaft 26 of the transmission 16. A radial orifice 82 extends between the motor housing 54 and the lube channel 80 to allow transmission fluid to flow from the motor housing 54 through the orifice 82 and into the lube channel 80, where the transmission fluid can flow axially through the input shaft to a sump (not shown) within the transmission. Seals positioned between the rotor 60 and the non-rotating pump support 30 direct transmission fluid through the oil passages 78 back to an oil sump within the transmission 16.

A hybrid powertrain and hybrid transmission of the present disclosure offers several advantages. The placement of the electric motor-generator unit 28 within the motor housing 54 of the pump support 30 allows the addition of the electric motor-generator unit 28 without changing apply and release pressures of an existing transmission without the electric motor-generator unit 28. This allows easy re-design of an existing multi-speed automatic transmission to incorporate an electric motor-generator unit 28 while minimizing any increase in size of the transmission.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A hybrid powertrain for an automobile, comprising:
a transmission adapted to provide power to wheels of the automobile;
an engine adapted to provide power to an input shaft of the transmission;
an electric motor-generator unit adapted to provide power to the input shaft of the transmission, wherein the electric motor-generator is positioned within the transmission, coaxial with the transmission input shaft, the electric motor-generator being supported by and enclosed within a pump support of the transmission; and
a torque converter positioned between and interconnecting the engine to the input shaft of the transmission, the torque converter having a one-way clutch adapted to drivingly connect the torque converter to the input shaft of the transmission when power is being provided to the torque converter from the engine and to allow the input shaft of the transmission to rotate freely relative to the torque converter when power is being provided to the input shaft of the transmission from the electric motor-generator unit.

2. The hybrid powertrain of claim 1, wherein the pump support defines a motor housing, the electric motor-generator including a stator that is positioned coaxially with the input shaft of the transmission and secured to inner walls of the motor housing and a rotor that is rotatably positioned coaxially with the input shaft of the transmission within the motor housing in operational engagement with the stator and rotatably attached to the input shaft of the transmission.

3. The hybrid powertrain of claim 2, wherein the transmission includes a two-piece stator shaft having a first piece and a second piece, wherein a gap between the first piece of the stator shaft and the second piece of the stator shaft is adapted to allow rotational attachment of the rotor of the electric motor-generator unit to the input shaft of the transmission.

4. The hybrid powertrain of claim 3, wherein the electric motor-generator unit is an axial flux electric motor-generator unit, wherein the stator and rotor are axially aligned.

5. The hybrid powertrain of claim 3, wherein the electric motor-generator unit is a radial flux electric motor-generator unit, wherein the stator is radially outward and encircles the rotor.

6. The hybrid powertrain of claim 3, further including a planetary gearset positioned between and interconnecting the rotor and the input shaft of the transmission.

7. The hybrid powertrain of claim 6, wherein the planetary gearset includes a ring gear, a sun gear, a carrier and a plurality of pinion gears supported on the carrier and in geared engagement with the sun gear and the ring gear, the carrier rotatably attached to the input shaft of the transmission.

8. The hybrid powertrain of claim 3, further including a connection hub positioned between and interconnecting the rotor and the input shaft of the transmission.

9. The hybrid powertrain of claim 8, wherein the connection hub includes oil passages defining a fluid connection between the motor housing and a lube channel within the input shaft of the transmission.

10. The hybrid powertrain of claim 1, wherein the electric motor-generator unit is one of a DC series motor, a brushless DC motor, a permanent magnet synchronous motor, a three-phase induction AC motor, a multi-phase induction AC motor and a switched reluctance motor.

11. A hybrid transmission for an automobile, comprising:
an input shaft adapted to receive power from an engine of the automobile;
an electric motor-generator unit adapted to provide power to the input shaft of the transmission, wherein the electric motor-generator is positioned within the transmission, coaxial with the transmission input shaft, the electric motor-generator being supported by and enclosed within a pump support of the transmission; and a torque converter adapted to interconnect an engine to the input shaft of the transmission, the torque converter having a one-way clutch adapted to drivingly connect the torque converter to the input shaft of the transmission when power is being provided to the torque converter and to allow the input shaft of the transmission to rotate freely relative to the torque converter when power is being provided to the input shaft of the transmission from the electric motor-generator unit.

12. The hybrid transmission of claim 11, wherein the pump support defines a motor housing, the electric motor-generator including a stator that is positioned coaxially with the input shaft of the transmission and secured to inner walls of the motor housing and a rotor that is rotatably positioned coaxially with the input shaft of the transmission within the motor housing in operational engagement with the stator and rotatably attached to the input shaft of the transmission.

13. The hybrid transmission of claim 12, wherein the transmission includes a two-piece stator shaft having a first piece and a second piece, a gap between the first piece of the stator shaft and the second piece of the stator shaft adapted to allow rotational attachment of the rotor of the electric motor-generator unit to the input shaft of the transmission.

14. The hybrid transmission of claim 13, wherein the electric motor-generator unit is an axial flux electric motor-generator unit, wherein the stator and rotor are axially aligned.

15. The hybrid transmission of claim 13, wherein the electric motor-generator unit is a radial flux electric motor-generator unit, wherein the stator is radially outward and encircles the rotor.

16. The hybrid transmission of claim 13, further including a planetary gearset positioned between and interconnecting the rotor and the input shaft of the transmission.

17. The hybrid transmission of claim 16, wherein the planetary gearset includes a ring gear, a sun gear, a carrier and a plurality of pinion gears supported on the carrier and in geared engagement with the sun gear and the ring gear, the carrier rotatably attached to the input shaft of the transmission.

18. The hybrid transmission of claim 13, further including a connection hub positioned between and interconnecting the rotor and the input shaft of the transmission, the connection hub including oil passages defining a fluid connection between the motor housing and a lube channel within the input shaft of the transmission.

19. The hybrid transmission of claim 11, wherein the electric motor-generator unit is one of a DC series motor, a brushless DC motor, a permanent magnet synchronous motor, a three-phase induction AC motor, a multi-phase induction AC motor and a switched reluctance motor.

20. A hybrid transmission for an automobile, comprising:
an input shaft;
a two-piece stator shaft having a first piece and a second piece;
a torque converter adapted to interconnect an engine to the input shaft of the transmission;
a pump support defining a motor housing; and
an electric motor-generator unit adapted to provide power to the input shaft of the transmission, wherein the electric motor-generator is positioned within the motor housing and includes a stator that is positioned coaxially with the input shaft of the transmission and secured to inner walls of the motor housing and a rotor that is rotatably positioned coaxially with the input shaft of the transmission within the motor housing in operational engagement with the stator and rotatably attached to the input shaft of the transmission by one of a planetary gearset and a connection hub, the electric motor-generator unit being one of an axial flux electric motor-generator unit, wherein the stator and rotor are axially aligned, and a radial flux electric motor-generator unit, wherein the stator is radially outward and encircles the rotor;
wherein, the torque converter includes a one-way clutch adapted to drivingly connect the torque converter to the input shaft of the transmission when power is being provided to the torque converter and to allow the input shaft of the transmission to rotate freely relative to the torque converter when power is being provided to the input shaft of the transmission from the electric motor-generator unit; and
the rotor of the electric motor-generator unit is rotationally attached to the input shaft of the transmission through a gap between the first piece of the stator shaft and the second piece of the stator shaft.

* * * * *